Patented May 10, 1932

1,858,097

UNITED STATES PATENT OFFICE

LEON LILIENFELD, OF VIENNA, AUSTRIA

MANUFACTURE OF ARTIFICIAL MATERIALS

No Drawing. Application filed March 13, 1930, Serial No. 435,647, and in Austria March 16, 1929.

According to the present invention technically valuable cellulose compounds are obtained by xanthating oxyalkyl derivatives of cellulose produced by acting upon cellulose or its near conversion products with oxyalkylating agents in presence of a substance of alkaline reaction, particularly caustic alkali.

According to their mode of formation, chemical behaviour and results of analysis, the cellulose compounds, in their free state, are o-oxyalkylcellulose xanthic acids (dithiocarbonic-o-oxyalkylcellulose esters), and in the form of their salts oxyalkylcellulosexanthates (salts of dithiocarbonic-o-oxyalkylcellulose esters).

The reaction leading to the formation of the cellulose compounds may (I believe) be represented for the simplest types by the following equations in which, as examples, are taken the monocellulose ether of ethylene glycol and the α-monocellulose ether of glycerine.

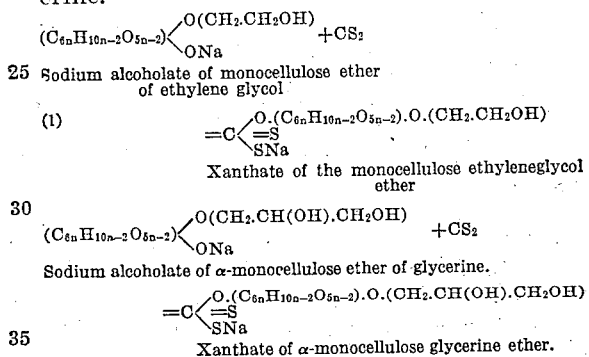

(1)

Sodium alcoholate of monocellulose ether of ethylene glycol

Xanthate of the monocellulose ethyleneglycol ether

Sodium alcoholate of α-monocellulose ether of glycerine.

Xanthate of α-monocellulose glycerine ether.

While the products of the reaction underlying the present invention are spoken of as xanthates of oxyalkyl derivatives (ethers) of cellulose or as o-oxyalkyl cellulose xanthates, it is not desired to limit this invention to any set chemical formulas or definitions, since, while the products are probably compounds or derivatives of the types mentioned, the final composition of the products is not definitely known. The reactions given above are given as explanatory, but I desire to make it clear that I do not limit the invention to the correctness thereof.

The process may be carried out in various ways, the prominent of which being the following:

First method

Alkali cellulose is acted upon with a halohydrine, the resulting reaction mass washed and thereafter treated with strong caustic alkali solution and carbon bisulphide.

Second method

Alkali cellulose is treated with a halohydrine, the resultant reaction mass, without being washed, exposed to the action of a further quantity of caustic alkali solution and finally contacted with carbon bisulphide.

Third method

Alkali cellulose is acted upon with a halohydrine and thereafter, without being washed and without being supplied with a fresh amount of caustic alkali solution, is treated with carbon bisulphide.

Fourth method

A halohydrine and carbon bisulphide are added to alkali cellulose simultaneously or (in either order) consecutively at a short interval, which, in the case of adding the carbon bisulphide before the halohydrine, must be so short that complete conversion of the alkali cellulose into xanthate does not occur.

Fifth method

Alkali cellulose is acted upon with a halohydrine, and the product of the reaction, i. e., the oxyalkyl ether of cellulose isolated from the reaction mixture. This can be effected, for example, by dissolving the reaction mass, if desired after washing it, in dilute caustic alkali solution, if necessary, freeing the thus obtained solution from undissolved particles by filtration, centrifuging, settling and decanting or the like and precipitating the dissolved oxyalkylcellulose by means of an acid substance or a dehydrating agent, such as alcohol. The so isolated oxyalkylcellulose is (if desired after being washed and, if desired, dried) thereafter redissolved in caustic alkali solution and exposed to the action of carbon bisulphide.

Sixth method

The process is conducted according to the fifth method, but with the difference that the reaction mass resulting from the treatment of the alkali cellulose with the halohydrine is washed and thereafter (if desired, after being dried) brought in contact with the caustic alkali solution of such strength that the quantity added to the oxyalkylcellulose together with the water (if any) contained in the latter will bring about such a proportion of water to caustic alkali and oxyalkylcellulose as is desired in the solution or paste intended for the technical use or for the isolation of the oxyalkylcellulosexanthate, whereupon the solution or paste or suspension (the character and the appearance of the reaction mass at this stage depends on the proportions of the alkali-soluble oxyalkyl derivative of cellulose, caustic alkali and water present) is acted upon with carbon bisulphide.

Seventh method

A halohydrine is allowed to act upon alkali cellulose, the resultant reaction mass, without being washed, is contacted with a quantity of water and/or caustic alkali which, together with the caustic alkali and water contained in the alkali cellulose, are sufficient to bring about such as strength of caustic alkali solution and proportion of the latter to the oxyalkylcellulosexanthate as are desired in the solution or paste intended for the technical use or for the isolation of the oxyalkylcellulosexanthate, whereupon the solution or paste or suspension (the character and the appearance of the reaction mass at this stage depends on the amount of the alkali-soluble oxyalkyl derivative of cellulose present) is acted upon with carbon bisulphide.

It is desired to state expressly that it is not intended to limit the invention to the foregoing methods of carrying it out and, in addition, that the o-oxyalkyl derivatives of cellulose or of its near conversion products may be prepared according to any process available for this purpose, i. e. according to the methods described herein or according to the processes described in my U. S. Patent No. 1,722,927 or according to any other process or method.

After the treatment with carbon bisulphide, the final products may be purified or isolated from the reaction masses or their (if desired, filtered) solutions, optionally after neutralizing them with a weak acid, for example acetic acid, by precipitating with an alcohol, such as methyl- or ethyl alcohol or with a solution of a salt, such as sodium chloride or an aluminum salt or the like or with carbon-dioxide or with sulphurous acid or with sodium bisulphite, or purified by dialysis or the like.

In many cases, however, purification or isolation is unnecsssary, since the crude reaction masses are readily soluble in caustic alkali solution and yield solutions that contain little or no undissolved particles.

The further working up of the products to produce artificial threads or other products is described and claimed in my copending U. S. application 435,648, or my British Patent No. 335,993.

The products of the invention, i. e. the oxyalkylcellulosexanthates are readily soluble in caustic alkali and water. On being acidified, they yield coagulates or precipitates which are insoluble in water. With salts of heavy metals, for instance zinc or copper, they yield salts of such metals.

That the oxyalkyl ethers of cellulose are capable of undergoing the xanthate reaction is rather surprising, considering that at least one (and if only one, probably the most reactive) hydroxyl group of the cellulose molecule is blocked by oxyalkyl groups. It is further remarkable that, in contrast to cellulose itself, the xanthate reaction takes place easily in presence of dilute alkali solutions (see Methods 5 to 7 and Examples 17, 18, 19, 20, 21 and 22.)

This modification of the present process makes possible the combination of the sulphidizing and of the dissolving step into one operation.

It is impossible to indicate every condition for success in every particular case and it is to be understood that preliminary experiments cannot be avoided to find what are the conditions necessary for success when using a particular cellulose, a particular halohydrine and a particular method of xanthation.

The following examples of operation serve as a practical illustration of the invention, which, however, is in no way limited to the examples; the parts are by weight:

*Example 1.*—1000 parts of wood-pulp (moisture 9 to 10 per cent.) or 1000 parts of cotton linters) (moisture 7 to 8 per cent.) are steeped in 20,000 parts of caustic soda solution of 18 per cent. strength at 15° C., and the reaction mixture is allowed to stand for 3 hours at room temperature. After this time the alkali cellulose is pressed down to 3400 parts and comminuted in a shredder for 3 hours at 12 to 13° C., whereupon 100 parts of $\alpha$-monochlorohydrine are added gradually (i. e. in a few portions), and the reaction mass kneaded in a shredder for about 3 hours at 20° C. Thereafter the reaction mass is transferred to a vessel, provided with a lid and kept in the closed vessel for 21 hours at 20° C.

A sample taken at that time shows that the mass in part has become soluble in dilute caustic soda solution (for instance of 10 per cent. strength), and that the filtered solution, on being acidified with dilute sulphuric acid, yields a bulky precipitate.

The reaction mass is now placed in a filter press or on a straining cloth and washed with water until free from alkali, whereupon it is pressed down to about three to four times the weight of the parent cellulose. The water content of the pressed product is determined by drying a sample at 105° C.

The mass is now (at 15° C.) well mixed with such an amount of water and caustic soda as, together with the water present in the mass, will give 20,000 parts of a caustic soda solution of 18 per cent. strength.

The reaction mixture is now allowed to remain at room temperature for 3 hours, whereupon it is pressed down to 3400 parts to 4000 parts and comminuted in a shredder for 3 hours at 12 to 13° C. Immediately after shredding, 600 parts of carbon bisulphide are added, and the reaction mass placed in a closed vessel and kept therein for 10 hours at 19° C. The excess carbon bisulphide is blown off during 15 minutes, and the xanthated mass is dissolved in water and caustic soda, for example so as to yield a solution containing about 5 to 7 per cent. of the dry residue of the washed and pressed oxyalkylated product and 8 per cent. of caustic soda.

The solution is practically free from undissolved particles and precipitable with strong solutions of salts, for example ammonium chloride or sodium chloride or ammonium sulphate or alcohol, or acids, for instance sulphuric acid or hydrochloric acid, or acid salts, for instance sodium bisulphate.

It is found that the precipitate obtained by addition of ethyl- or methyl alcohol under stirring when collected on a filter, washed a few times with alcohol, extracted with ether and dried at room temperature under reduced pressure, is an almost colorless, flocculent or lumpy substance which is readily soluble in caustic alkali solution. Its solutions are precipitated on being acidified, for example with sulphuric acid. On being analyzed according to Zeisel's method (heating with hydriodic acid and allowing the alkyl—in the present case isopropyl—iodide to enter an alcoholic silver nitrate solution), the substance obtained from the solution by precipitating it with alcohol as well as the washed and dried substance precipitated from the solution by means of sulphuric acid yields 1.79 per cent. of $C_3H_7O$.

If both substances are boiled under reflux with an alcoholic caustic potash solution of 20 per cent. strength or with an aqueous caustic potash solution of 20 per cent. for 24 hours, and all four products are thoroughly washed until free from alkali, extracted with alcohol and ether, dried and the amount of $C_3H_7O$ determined therein, the analyses give the following $C_3H_7O$-figures:

(1) Substance precipitated with alcohol and boiled with alcoholic caustic potash solution: 1.93 per cent.

(2) Substance precipitated with alcohol and boiled with aqueous caustic potash solution: 1.89 per cent.

(3) Substance precipitated with sulphuric acid and boiled with alcoholic caustic potash solution: 1.78 per cent.

(4) Substance precipitated with sulphuric acid and boiled with aqueous caustic potash solution: 1.91 per cent.

*Example 2.*—The process is conducted as in Example 1, with the difference that, instead of 100 parts, 200 parts of α-monochlorohydrine are employed.

The working up of the xanthate is carried out as in Example 1.

The properties of the final product and of its solutions are similar to those of the final product obtained in Example 1.

The $C_3H_7O$-figures are as follows:

(1) Body precipitated with sulphuric acid: 2.78 per cent.

(2) Body precipitated with sulphric acid and boiled with alcoholic caustic potash solution: 2.62 per cent.

(3) Body precipitated with sulphuric acid and boiled with aqueous caustic potash solution: 2.81 per cent.

*Example 3.*—Mode of procedure as in Example 1, with the exception that instead of 100 parts, 300 parts of α-monochlorohydrine are used. The pressing of the mass consisting of the o-oxyalkylated product and caustic soda solution is somewhat more difficult than in Example 1 or 2 and is to be performed slowly and by degrees.

The properties of the final product and of its solutions are similar to those of the final product obtained in Example 1.

*Example 4.*—The process is conducted as in Example 1, but with the difference that, instead of the 100 parts of α-monochlorohydrine, 100 parts of ethylene chlorohydrine are added to the alkali cellulose.

The working up of the xanthate is carried out as in Example 1.

The properties of the final product and of its solutions are similar to those of the final product obtained in Example 1.

*Example 5.*—The process is conducted as in Example 4, but with the difference that, instead of 100 parts, 200 parts of ethylene chlorohydrine are added to the alkali cellulose.

The working up of the xanthate is carried out as in Example 1.

The properties of the final product and of its solutions are similar to those of the final product obtained in Example 1.

*Example 6.*—The process is conducted as in one of the preceding examples, with the exception that, immediately after having been mixed with the α-monochlorohydrine or ethylene chlorohydrine respectively for 3 hours, the reaction mass is washed and then dealt with as in any of the preceding examples.

The properties of the final product are similar to those obtained in the preceding examples.

*Example 7.*—Mode of procedure as in any of the preceding examples, with the difference that the reaction mass resulting from the oxyalkylating step is, without being washed, steeped in 16600 parts of caustic soda solution of 18 per cent. strength at 15° C. and then, by pressing, shredding and sulphidizing worked up into the final xanthate exactly as in any of the preceding examples.

The properties of the final product and of its solutions are similar to those of the final product obtained in the preceding examples.

*Example 8.*—1000 parts of wood-pulp (moisture 9 to 10 per cent.) or 1000 parts of cotton linters (moisture 7 to 8 per cent.) are steeped in 20,000 parts of caustic soda solution of 18 per cent. strength at 15° C., and the reaction mixture is allowed to stand for 3 hours at room temperature. After this time the alkali cellulose is pressed down to 3400 parts and comminuted in a shredder for 3 hours at 12 to 13° C., whereupon 100 parts of α-monochlorohydrine are added gradually (e. g. in a few portions), and the reaction mass kneaded in a shredder for about 3 hours at 20° C. Thereafter the reaction mass is transferred to a vessel, provided with a lid, and kept in the closed vessel for 21 hours at 20° C.

Immediately thereafter 600 parts of carbon bisulphide are added and allowed to act for 8 hours at 19 to 20° C. The excess carbon bisulphide is now blown off during 15 to 20 minutes, and the thus produced xanthate dissolved, for example in such a quantity of caustic soda and water that the solution contains the equivalent of about 5 to 6 per cent. of parent cellulose and 8 per cent. of NaOH.

The solution is practically free from undissolved particles and precipitable with strong solutions of salts, for example ammonium chloride or sodium chloride or ammonium sulphate, or alcohol, or acids, for instance sulphuric acid or hydrochloric acid, or acid salts, for instance sodium bisulphate.

When the precipitate obtained by addition of ethyl or methyl alcohol under stirring is collected on a filter, washed a few times with alcohol, extracted with ether and dried at room temperature under reduced pressure, the product is an almost colorless, flocculent or lumpy substance, which is readily soluble in caustic alkali solution and water. Both solutions are precipitated on being acidified, for example with sulphuric acid.

The analytical results are similar to those obtained in Example 1.

*Example 9.*—The process is conducted as in Example 8, but with the difference that, instead of the 100 parts of α-monochlorohydrine, 100 parts of ethylene chlorohydrine are used, and that the xanthate is dissolved in such a quantity of water and caustic soda as to yield a solution containing the equivalent of 6.5 per cent. of the parent cellulose and 8 per cent. of NaOH.

The properties of the final product are similar to those of the product obtained in Example 1.

*Example 10.*—The process is conducted as in Example 9, but with the difference that, instead of 100 parts, 200 parts of ethylene chlorohydrine are employed.

The working up of the xanthate is carried out as in the preceding examples.

The properties of the final product obtained are similar to those of the product obtained in Example 1.

*Example 11.*—The process is conducted as in Example 9, but with the difference that, instead of 100 parts, 300 parts of ethylene chlorohydrine are employed.

The working up of the xanthate is carried out as in one of the preceding examples.

The properties of the final product and of its solutions are similar to those of the final product obtained in Example 1.

*Example 12.*—The process is conducted as in Example 9, but with the difference that, instead of 100 parts, 500 parts of ethylene chlorohydrine are used.

The working up of the xanthate is carried out as in one of the preceding examples.

The properties of the final product are similar to those of the product obtained in Example 1.

*Example 13.*—The process is conducted as in any of the Examples 9, or 10, or 11, or 12, but with the difference that the addition of the ethylene chlorohydrine takes place at 15° C. that the kneading or shredding of the reaction mass consisting of alkali cellulose and ethylene chlorohydrine takes 3 hours at 15° C., and that the carbon bisulphide is added immediatley after these 3 hours have elapsed.

The working up of the xanthate is carried out as in one of the preceding examples.

The properties of the final product are similar to those of the product obtained in Example 1.

*Example 14.*—The process is conducted as in any of the Examples 9 to 13, but with the exception that the product of the xanthate reaction is dissolved in such an amount of water and caustic soda as to yield a solution containing the equivalent of about 7 to 8 per cent. of the parent cellulose and 5 per cent. of NaOH.

The working up of the xanthate is carried out as in one of the preceding examples.

The properties of the final product are similar to those of the product obtained in Example 1.

*Example 15.*—1000 parts of wood-pulp (moisture 9 to 10 per cent.) or 1000 parts of cotton linters (moisture 7 to 8 per cent.) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C. The comminuted mass is thereafter left in the shredder and its temperature raised to 20° C., whereupon 300 parts of ethylene chlorohydrine and immediately afterwards 600 parts of carbon bisulphide are added the shredder well closed and the kneading continued for 5 hours at about 20° C. The excess carbon bisulphide is blown off during 15 to 20 minutes, and the xanthate is dissolved in caustic soda and water in such proportions that the solution contains the equivalent of 3 per cent. of the parent cellulose and 8 per cent. of NaOH.

The working up of the xanthate is carried out as in one of the preceding examples.

The properties of the final product are similar to those of the product obtained in Example 1.

*Example 16.*—1000 parts of wood-pulp or cotton linters are placed in a shredder and 2025 parts of caustic soda solution of 20 per cent. strength are added in small portions, while shredding, the addition taking up about 1 hour, whereafter the shredding is continued for another 90 minutes at 19° C. Then 300 parts of ethylene chlorohydrine are added drop by drop, and the shredding continued for 3 hours at 23° C. After that time 600 parts of carbon bisulphide are introduced, the shredder well closed, and the shredding continued for another 4 hours at 20° C. The excess carbon bisulphide is blown off and the mass worked up as in one of the preceding examples.

The properties of the final product are similar to those of the product obtained in Example 1.

*Example 17.*—1000 parts of wood-pulp or cotton linters are steeped in 20,000 parts of caustic soda solution of 18 per cent. strength at 15° C., and the reaction mixture is allowed to stand for 3 hours at room temperature. After this time the alkali cellulose is pressed down to 3400 parts and comminuted in a shredder for 3 hours at 12 to 13° C., whereupon 200 parts of α-monochlorohydrine are added in a few portions, and the reaction mass kneaded in a shredder for 3 hours at 20° C. Thereafter the reaction mass is transferred to a vessel, provided with a lid and kept in the closed vessel for 21 hours at 20° C.

A sample taken at that time shows that the mass in greater part has become soluble in dilute caustic soda solution (for instance of 10 per cent. strength), and that the filtered solution, on being acidified with dilute sulphuric acid, yields a bulky precipitate.

The mass is now dissolved in 75,000 parts of a caustic soda solution of 8 per cent. strength, wherein it dissolves not completely, but with a residue. After standing for 12 hours at room temperature, the suspension is filtered and the clear filtrate precipitated by acidifying with sulphuric acid of 15 per cent. strength. The flocculent precipitate is freed from the mother liquor in a filterpress or on a straining cloth, washed with water until free from acid, pressed and after its water content has been determined dissolved in such an amount of caustic soda and water as to yield a solution containing 7 per cent. of the cellulose glycerin ether and 8 per cent. of NaOH. To this solution 100 per cent. of carbon bisulphide (calculated on the weight of the cellulose glycerin ether) are added, and the reaction mixture kept shaken for 20 hours at 20° C.

The properties of the final product and of its solutions are similar to those of the final product obtained in Example 1.

The $C_3H_7O$-figures are as follows:

(1) Body precipitated with sulphuric acid: 2.53%.

(2) Body precipitated with sulphuric acid and boiled with alcoholic caustic potash solution: 2.05%.

*Example 18.*—The process is carried out as in Example 17 but with the difference that the initial shredding and the reaction between the alkali cellulose and the α-monochlorohydrine is conducted at 15° C.

The working up of the xanthate is carried out as in Example 17.

The properties of the final product and of its solutions are similar to those of the final product obtained in Example 17.

*Example 19.*—Mode of procedure as in Example 17 or 18, but with the exception that, instead of 200 parts, 300 parts of α-monochlorohydrine are used.

The working up of the xanthate is carried out as in Example 17.

The properties of the final product and of its solutions are similar to those of the final product obtained in Example 17.

*Example 20.*—The process is conducted as in Example 18, but with the difference that, instead of the 200 parts of α-monochlorohydrine, 200 parts of ethylene chlorohydrine are used.

*Example 21.*—The process is conducted as in Example 17, but with the difference that, instead of the 200 parts of α-monochlorohydrine, 300 parts of ethylene chlorohydrine are employed.

*Example 22.*—The process is conducted as in Example 21, but with the exception that 20 parts of copper acetate dissolved in 30 parts of water are added to the alkali cellulose after shredding and before adding the ethylene chlorohydrine.

*Example 23.*—The process is conducted as in Example 17, but with the difference that, instead of the 200 parts of α-monochlorohydrine, 500 parts of ethylene chlorohydrine are used, and that the washed product of the reaction between the alkali cellulose and the ethylene chlorohydrine (after its water content has been determined) is, without being purified, dissolved direct in such a quantity of water and caustic soda as to yield a solution containing about 7 per cent. of the cellulose glycol ether and 8 per cent. of NaOH. To this clear solution which is free from undissolved particles the carbon bisulphide is added and then proceed as in Example 17.

*Example 24.*—The process is conducted as in Example 23, but with the difference that, 20 parts of copper acetate dissolved in 30 parts of water are added to the alkali cellulose after shredding and before adding the ethylene chlorohydrine.

*Example 25.*—Mode of procedure as in any of the preceding Examples, but with the difference that, instead of α-monochlorohydrine or ethylene chlorohydrine, an equimolecular quantity of polylene-chlorohydrine is used.

*Example 26.*—Mode of procedure as in any one of Examples 1 to 13, but with the difference that, instead of α-monochlorohydrine or ethylene chlorohydrine an equimolecular quantity of mannite-chlorohydrine is used.

*Example 27.*—Mode of procedure as in Example 1 but with the difference that, instead of the aqueous caustic soda solution of 18 per cent. strength, a 30 per cent. caustic soda solution in alcohol of 62.7 per cent. is used and that, instead of 200 parts of α-monochlorhydrine, 600 to 1000 parts of epichlorohydrine are used.

*Example 28.*—Mode of procedure as in Examples 1 to 15 and 17 to 26, but with the difference that the initial alkali cellulose is allowed to mature for 48 to 72 hours at 15 or 20° C.

In the foregoing examples, in making the oxyalkyl ether of cellulose a small amount of a catalyzer, for example of a metal salt, such as copper salt, nickel salt, silver salt, zinc salt, iron salt or the like may be added to the alkali cellulose or reacting mixture.

In the foregoing examples, instead of the chlorohydrines used, equivalent quantities of the corresponding bromo- or iodohydrines may be employed.

Instead of the halogen derivatives named in the above examples, equivalent quantities of other halogen derivatives may be used, for instance, pinacone chlorohydrine (tetramethylethylene chlorohydrine), erythrite chlorohydrine, pentaerythrite chlorohydrine, dulcitan monochlorohydrine, trimethyleneglycol chlorohydrine, divinylethyleneglycol chlorohydrine, phenylpropanol chlorohydrine, naphthylpropanol chlorohydrine, 4-methoxynaphthylpropanol chlorohydrine and the like.

The invention is not intended to be limited to monohalohydrines. It should be stated however, that the products of the reaction between cellulose and monohalohydrines yield, according to the present process, xanthates that are soluble in aqueous alkali solution, whilst some products of the reaction between cellulose and dihalohydrines (for example α-dihalohydrine of glycerine) when treated with carbon bisulphide in the presence of alkali yield materials which are only partly soluble or even insoluble in aqueous alkali solutions, particularly when the dihalohydrines are used in considerable quantities. As, however, the cellulose derivatives obtained by treating cellulose with some other dihalohydrines (for example mannitedichlorohydrine or pinaconedichlorohydrine) in presence of alkali are convertible into xanthates that are readily soluble in aqueous alkali solution, there is no need to restrict the present invention to monohalohydrines. Where the tendency exists for the dihalohydrines to form insoluble compounds with alkali cellulose it is recommended that the dihalohydrines should be used in such quantities or mixed with monohalohydrines as will still enable the production of soluble compounds by means of caustic alkali and carbon bisulphide.

In the foregoing examples, instead of caustic soda, another alkali metal hydroxide, such as caustic potash may be used.

In the foregoing examples, instead of caustic alkalies, sulphonium hydroxides (for instance trimethylsulphonium hydroxide) may be used.

Instead of cellulose, its near conversion products, such as cellulose hydrate or hydrocellulose or oxycellulose may be used in the foregoing examples.

In the foregoing examples, the reaction or the dissolution of the reaction products may take place at low temperatures also, for example at 0° C. or minus 5 to minus 10° C.

The term "alkali cellulose" wherever the context permits, means alkali cellulose prepared in the usual manner, namely by steeping cellulose in caustic alkali solution and removing the excess of the latter by pressing or by mixing cellulose with such an amount of caustic alkali solution as is desired to be present in the final alkali cellulose.

The expression "halohydrine" used in the specification and the claims includes wherever the context permits the compounds containing both at least one halogen and at least one hydroxyl group which may be regarded as being derived from a di- or polyhydroxy-alcohol by the partial exchange of the hydroxyl groups for chlorine, bromine or iodine (or from a mono- or polyhydroxy alcohol by the substitution of one or more hydrogen atoms in the alcohol radical), and the derivatives (such as the esters) or internal anhydrides (such as epichlorohydrine) of such halohydrines, or substances or mixtures of substances which are capable of yielding such halohydrines.

Although, according to general practice, the term "oxy" covers also "hydroxy", to avoid any misunderstanding, it is pointed out that in the specification and claims the term "oxy" is intended to cover "hydroxy" also.

The term "oxyalkyl" is intended to include the halogenated or non-halogenated radicals of di- or polyvalent alcohols including also the anhydrides thereof in conjunction with one or more oxygens or hydroxyls.

What I claim is:—

1. The herein described process of making new cellulose derivatives which comprises acting on an oxyalkyl derivative of cellulose, prepared by the action of an oxyalkylating agent on cellulose in the presence of alkali, with carbon bisulphide in presence of a basic substance.

2. A process of making new cellulose derivatives which comprises acting upon alkali cellulose with a halohydrine and treating the resulting cellulose compound with caustic alkali solution and carbon bisulphide.

3. A process of making new cellulose derivatives which comprises acting on alkali cellulose with a halohydrine, and contacting the resultant reaction mass, without washing the latter, with a further quantity of caustic alkali solution and finally with carbon bisulphide.

4. A process of making new cellulose derivatives which comprises acting upon alkali cellulose with a halohydrine, and thereafter, without washing and without adding a further amount of caustic alkali solution, treating the product of the first step with carbon bisulphide.

5. A process of making new cellulose derivatives which comprises simultaneously treating alkali cellulose with a halohydrine and carbon bisulphide.

6. A process as covered in claim 1, wherein a mixture of an oxyalkyl derivative of cellulose in caustic alkali solution is treated with carbon bisulphide.

7. The herein described process of making new cellulose compounds by acting on an oxyalkyl derivative of cellulose made by the action of an oxyalkylating agent on cellulose in the presence of an alkali, with carbon bisulphide in presence of a caustic alkali.

8. A process of making a new cellulose derivative which comprises acting upon alkali cellulose with a halohydrine, washing the resulting cellulose compound to remove water-soluble by-products, and treating the same with caustic alkali solution and carbon bisulphide.

9. A process of making new cellulose derivatives which comprises acting upon alkali cellulose with a halohydrine, and treating the resulting cellulose compound with caustic alkali solution and carbon bisulphide.

10. A process of making cellulose derivatives which comprises treating alkali cellulose with a halohydrine and carbon bisulphide.

11. A process for the manufacture of xanthated cellulose compounds by xanthating an oxyalkyl derivative of cellulose obtained by acting upon cellulose with an oxyalkylating agent in presence of a substance of alkaline reaction.

12. A process for the manufacture of xanthated cellulose compounds by xanthating an oxyalkyl derivative of cellulose obtained by acting upon cellulose with an oxyalkylating agent in presence of a caustic alkali.

13. A process for the manufacture of xanthated cellulose compounds by xanthating an oxyalkyl derivative of cellulose obtained by oxyalkylating alkali cellulose.

14. A process for the manufacture of xanthated cellulose compounds wherein alkali cellulose is treated with a halohydrine and carbon bisulphide, consecutively in the order here stated.

15. A process for the manufacture of xanthated cellulose compounds, wherein alkali cellulose is treated with carbon bisulphide and then, before complete conversion of the alkali cellulose into cellulose xanthate has occurred, treating the mixture with a halohydrine.

16. As new products, xanthates of such oxyalkyl derivatives of cellulose as are produced by acting upon cellulose with an oxyalkylating agent in presence of caustic alkali.

17. As new products, xanthates of such oxyalkyl derivatives of cellulose as are produced by acting upon cellulose with an oxyalkylating agent in presence of caustic alkali, said xanthates being soluble in caustic alkali solutions producing solutions which are precipitable by viscose precipitants commonly used.

18. As new products, solutions of the xanthates of such oxyalkyl derivatives of cellulose as are produced by acting upon cellulose with an oxyalkylating agent in presence of caustic alkali.

19. As new products, solutions of the xanthates of such oxyalkyl derivatives of cellulose as are produced by acting upon cellulose with an oxyalkylating agent in presence of caustic alkali, said xanthates being soluble in caustic alkali solutions producing solutions which are precipitable by viscose precipitants commonly used.

In testimony whereof I affix my signature.

LEON LILIENFELD.